Aug. 27, 1929.     J. A. GERMONPREZ     1,725,907
BRAKE
Original Filed Sept. 12, 1923
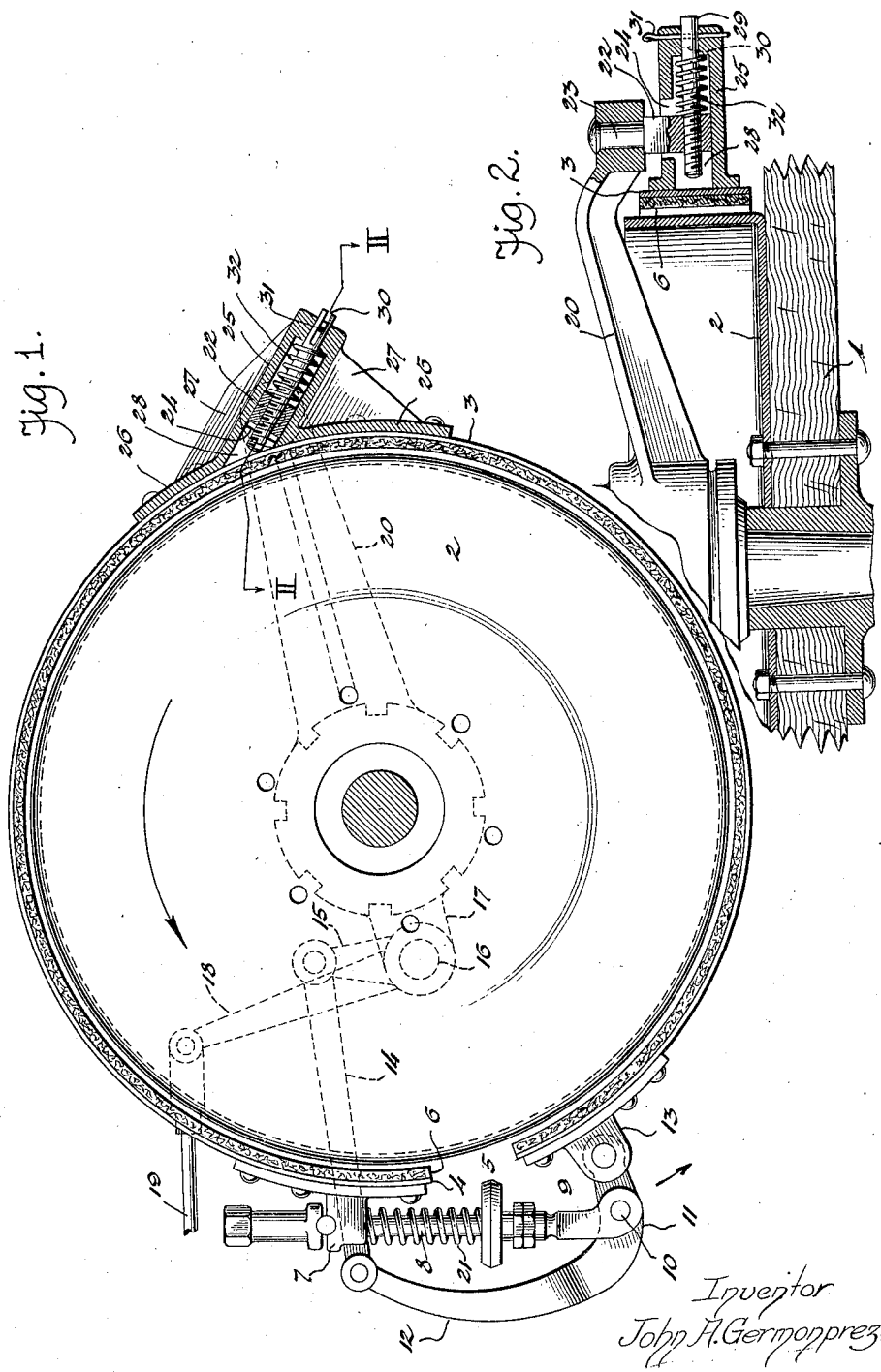
Inventor
John A. Germonprez,
by
Attys.

Patented Aug. 27, 1929.

1,725,907

UNITED STATES PATENT OFFICE.

JOHN A. GERMONPREZ, OF DETROIT, MICHIGAN, ASSIGNOR TO STEELDRAULIC BRAKE CORPORATION, OF DETROIT, MICHIGAN, A CORPORATION OF MICHIGAN.

BRAKE.

Application filed September 12, 1923, Serial No. 662,188. Renewed January 9, 1929.

This invention relates to brakes, and has special reference to that class of brakes for drums, wheels and other rotatable members adapted to have the rotation thereof controlled by a brake band, flexible strap or member which surrounds the rotatable member and is contractible relative thereto. In this type of brake the intermediate portion of the brake band is held for radial movement relative to the periphery of the rotatable member adapted to be controlled by the brake band, and a brake operating mechanism is associated with one or both ends of the brake band for contracting or distending the band relative to the rotatable member. I am aware that some brake bands are supported by members movable in a direction radially of their brake drums, but such members often fail to move upon contraction of the bands, thus preventing the intermediate portion of the band from moving inward toward its drum. These members supporting and carrying the intermediate portion of the band stick or become fixed due to many causes, mainly dirt, rust or poor lubrication, with the result that the intermediate portion of the band is prevented from engaging the drum and thus decreasing the efficiency of the brake and causing a grinding, screeching noise due to loose and uneven contact of the band with its drum. Such noise is undesirable in the operation of a brake mechanism, particularly when forming part of an automobile, and my invention aims to eliminate the noise by a novel brake band anchorage and to increase the efficiency of the brake by insuring and increasing the frictional contact between band and drum throughout the intermediate portion of the band.

Instead of supporting the intermediate portion of a brake band in such a manner that only radial movement relative to a brake drum may be had, I provide a brake band mounting which permits of bodily movement of the band in the direction of drum rotation and inwardly toward said drum, the torsional strain on the band due to its frictional contact with its drum, insuring the inward movement of the intermediate portion thereof toward the drum. This inward movement occurs whenever the brake band is brought into frictional contact with the drum by being contracted or applied about the drum, bringing all portions of the brake band into even frictional engagement with the drum and by the force applied to the band by the turning movement of the drum to move the band inwardly, increasing the frictional contact and insuring a maximum of braking efficiency. Even frictional engagement of the band with its drum throughout its length also prevents the grinding, chattering noise inherent in brakes as commonly constructed where such even engagement is not present.

My brake band mounting includes an anchorage guide for the movable brake member, which guide is inclined in the direction of rotation of the drum and means for retracting the intermediate portion of the brake band relative to the drum when released, and I have found that this mounting may be advantageously used in connection with any circumferential brake member adapted to be brought into contact with a rotatable member to retard its rotation, irrespective of the type of operating mechanism associated with the circumferential member. It is in this connection that my mounting may be substituted for those already in use and a better and more satisfactory braking action attained.

The construction entering into my invention will be hereinafter described and then claimed, and reference will now be had to the drawing, wherein Figure 1 is a side elevation of a brake drum having a brake band supported by a mounting in accordance with this invention, and Fig. 2 is a sectional view taken on the line II—II of Fig. 1.

As illustrative of an adaptation of the invention for use in connection with an automobile, I have shown in the accompanying drawing a wheel portion 1 provided with a brake drum 2, and surrounding the periphery of said brake drum is a brake band having an intermediate portion 3, end portions 4 and 5, and a brake lining 6.

On the end portion 4 of the brake band is a bearing 7, and fulcrumed on said bearing is an adjustable connecting rod 8 provided with a fork 9 pivotally connected, as at 10, to the curved end 11 of an arm 12. The arm 12 has its curved end 11 pivotally connected to a bearing 13 on the end portion 5 of the brake band, and the opposite end of the arm 12 is connected by a link 110

14 to a short crank 15 of a rock shaft 16, said rock shaft being journaled in a bearing or arm 17 supported adjacent the brake drum 2. The rock shaft 16 has a long crank 18 connected to an operating rod 19, and all of the elements, 7 to 19 inclusive, constitute a common form of brake operating mechanism for automobiles constructed and arranged to operate in an old and well known manner.

The intermediate portion 3 of the brake band is ordinarily adjustably anchored to or supported by an arm 20 or other rigid, fixed member secured to the axle housing or other non-rotatable part, said band being connected to a suitable connecting member movable radially of the drum upon a block carried by said arm so that the intermediate portion of the band may move radially inward toward the drum when the end portions 4 and 5 of the band are moved toward each other to cause said brake band to be contracted about the drum. Also as ordinarily constructed, a spring 21 is associated with the connecting rod 8 to cause the brake band to be normally distended, and a spring is provided to normally hold the connecting member to which the intermediate portion of the band is secured, moved outwardly away from the drum with this intermediate portion of the band out of contact with the drum. In practice, it has been found that after a period of use, the intermediate portion of the band will not be moved toward the drum upon contraction of the band, but due to inefficient lubrication, dirt and rust, the member to which the band is connected and which is intended to slide upon the supporting block, will stick and prevent the intermediate portion of the band from being brought into frictional contact with the drum, thus impairing the efficiency of the brake and also causing an uneven application of the band to the drum which will cause a chattering, griding disagreeable noise.

The present invention consists in so anchoring or supporting the intermediate portion of the brake band or other movable contact member, that the frictional contact of said member with the rotating member when the brake is applied, will cause a drag on the band and the turning power of the drum will be applied to the band to move the same bodily, and, due to the manner of anchoring the band so that it may move toward and in the direction of rotation of the drum, causing the intermediate portion of said band to be positively forced toward the drum by such turning power. The mounting or anchorage for the intermediate portion 3 of the brake band comprises a block 22 having a pin 23 pivotally supporting the block relative to the bracket or fixed arm 20, so that the block 22 may turn about the axis of the pin 23, and this block extends through a slot 24 in the side wall of a connecting member or housing 25 inclined toward a tangential position relative to the drum; which housing has arcuated flanges 26 rigidly secured in any suitable manner to the intermediate portion 3 of the brake band with reinforcing ribs or webs 27 connecting said flanges to the walls of the housing 25. The connecting member or housing 25 has a longitudinal way or slot 28 for the block 22, so that said member may slide on the block toward and from the drum, and the movement of the member 25 relative to the block may be limited in one direction by a stop screw 29 engaging a screw-threaded opening in the block and extending longitudinally of the way or slot 28 through the block with its inner end in position to contact the band and limit the movement of the band and connecting member away from the drum. The outer end of the screw projects through the outer end of the connecting member or casing 25 and is slotted as at 30 for the engagement therewith of a screw-driver by means of which the screw may be turned for the purpose of adjustment. Movement of the intermediate portion of the band and connecting member in an opposite direction or toward the drum is yieldingly resisted by a coiled spring 32 sleeved upon the screw 29 between the block 22 and the closed end of the slot or guideway 28, said spring being compressed by the movement of the band toward the drum when the band is contracted, and normally exerting a force to move the connecting member outwardly upon the block with the band out of contact with the drum and in contact with the stop screw. Turning movement of the screw when properly set, is prevented by a pin 31 engaging a hole in the outer end of the casing 25 and extending through the slot 30 in the screw.

The construction of this anchorage for the intermediate portion of the brake band is very similar to the means commonly employed for the purpose, with the exception that the band is so anchored that the turning movement of the drum applies power to the band to force the intermediate portion thereof toward the drum, the direction of such force and turning movement of the drum as indicated by the arrow in Fig. 1, being in the direction of movement of the connecting member or casing 25 upon its supporting block 22, due to the fact that the guide or slot 28 is inclined in the direction of rotation of the drum or in a direction inclined to a radius of the drum and toward a tangent to the periphery of the drum which is frictionally engaged by the brake band. The longitudinal drag on the band by its engagement with the revolving drum thus exerts a direct positive pull upon the casing or member 25 in a direction longitudinally of its guide slot 28 to move it upon the block 22 instead of exerting a force transversely of said guide slot as is the case in the common construction, where such slot extends radially of the drum. This force exerted by the rotating drum which tends to move the band longitudinally, thus pulls the casing 25 toward the drum and as the guide slot therein is substantially tangent to the drum periphery, the casing is free to move upon its supporting block and the greater the drag, the greater will be the frictional contact between the intermediate portion of the band and the drum surface due to the wedging action of the casing between the drum and block. The proper contact between drum and intermediate portion of the band is insured when the ends of the band are positively moved toward each other by the lever mechanism, and even contact of the band with its drum is insured throughout the length of the band. By arranging the brake band anchorage member to shift in the direction of rotation of the drum in contradistinction to a radial direction, there will be no chattering or vibrating motion of the band upon the brake drum, and it is through the even and uniform application of the entire brake band to the brake drum that the noise, so often heard when applying an automobile brake of the drum and band type, is eliminated. As the force which moves the connecting member or casing 25 upon its supporting block 22 is applied in a direction longitudinally of the guide way, the movement of said member and band toward the drum will not be prevented by the action of the elements causing rusting of the guide or by dirt lodging therein. Then again, the inherent tendency of a brake band, when being applied to a brake drum, is to shift in the direction of rotation of the brake drum, and if the brake band is held against such movement, there is bound to be stresses and strains set up which will produce noise and uneven wear of the parts and of the brake lining. In my construction the brake band may shift bodily in a rotational direction to bring the brake lining into even frictional contact with the periphery of the brake drum, without necessarily subjecting the pivot block to any stresses or strains that would cause noise and uneven wear of the parts or of the brake lining.

From the foregoing it is obvious that the anchorage embodying the invention permits of a yielding, self-adjustment of the outer brake member and insures engagement thereof with the rotary member, the rotation of which forces the outer member into strong frictional contact with the inner member, increasing the efficiency of the brake, and the invention may be used in connection with any brake member that is adjustable relative to a rotatable member. For this reason, I do not care to confine my invention to any structural details other than as set forth in certain of the appended claims.

What I claim is:—

1. In a brake, the combination with a rotatable member, a brake band to engage said rotatable member, and means for operating said brake band to bring it into frictional contact with said rotatable member, of an anchorage for said brake band including a stationary support adjacent the rotatable member, a connecting member secured to an intermediate portion of said brake band and formed with a guideway having parallel sides extending at an angle to the periphery of said rotatable member, approximating a tangent thereto, said support being engaged within said guideway to guide said connecting member in its movement upon said support in a direction substantially tangent to the periphery of said rotatable member, a spring within the guideway engaging said support to move the connecting member upon said support away from the rotatable member and adjustable means for limiting the movement of the connecting member toward the rotatable member.

2. In a brake, the combination with a rotatable member, a brake band to engage said rotatable member, and means for operating said brake band to bring it into frictional contact with said rotatable member, of an anchorage for said brake band including a fixed bracket, a block carried by said bracket adjacent the periphery of the rotatable member, a connecting member secured to the brake band at an intermediate portion of the band and formed with a guideway having parallel sides extending at an angle to the periphery of said rotatable member, approximating a tangent thereto, said block being engaged within said guideway for guiding said connecting member toward and from the rotatable member in a direction substantially tangent to the periphery of the rotatable member, a spring within the guideway to yieldingly hold the connecting member moved away from the rotatable member and an adjusting screw engaging the block and adapted to limit the movement of the connecting member upon the block.

In testimony whereof I affix my signature.

JOHN A. GERMONPREZ.